Dec. 29, 1936.  W. C. BERRYMAN  2,065,558
CORROSION PREVENTING MEANS FOR CONNECTIONS
Filed Nov. 10, 1934
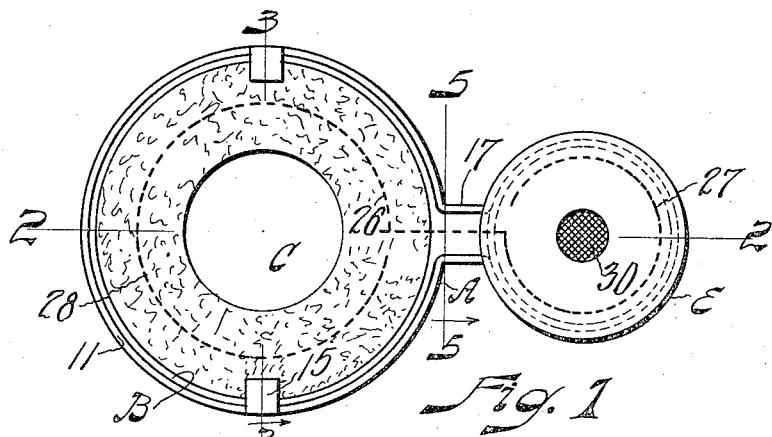
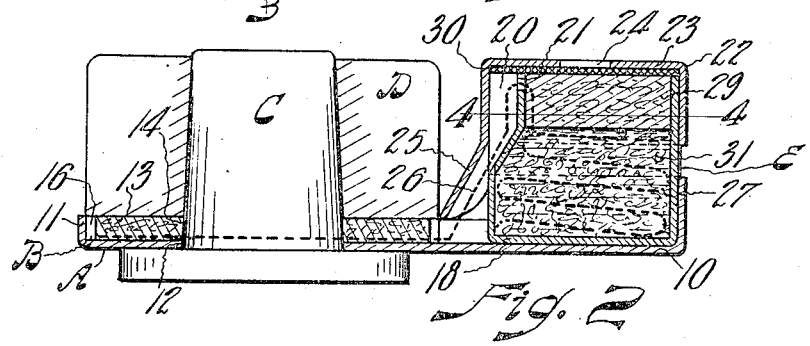
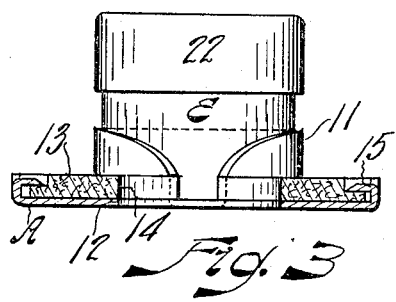
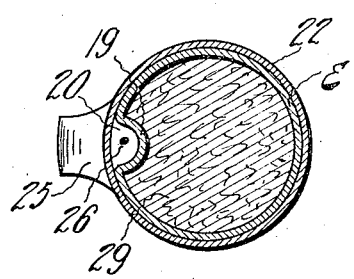
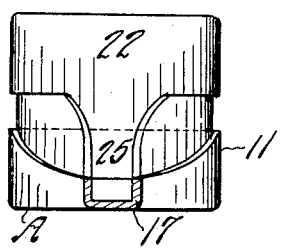
INVENTOR
W. C. Berryman
BY
C. F. Henkel
ATTORNEY Patented Dec. 29, 1936

2,065,558

UNITED STATES PATENT OFFICE 2,065,558

CORROSION PREVENTING MEANS FOR CONNECTIONS

Warren C. Berryman, Lakewood, Ohio

Application November 10, 1934, Serial No. 752,415

8 Claims. (Cl. 173—259)

The present invention relates to protecting connections against corrosion and is partly disclosed in my Patents No. 1,961,954 and No. 1,961,955 and in my pending application Serial No. 748,167.

In many instances, such as the connections of lead wire terminals to terminal posts of storage batteries and other connections, electrical and otherwise, there is possibility of corrosion of the connecting members and the connecting joint between them. Such corrosion may be brought about by acid fumes from storage batteries, or by atmospheric conditions, or by moisture, or by substance carried by the atmosphere and usually must be tolerated and periodic means and measures resorted to in order to prevent corrosion of connections. The present invention aims to prevent corrosion in and on connections.

Objects of the present invention are:

To provide a corrosion preventing device which is applicable to a connection without making any alteration in the members of the connection.

To provide such a device with means for keeping the connection unctuous to prevent corrosion thereof by providing means in the device for storing and restrictively feeding corrosion preventing substance to the connection.

To provide such a device with means to prevent overflowing of corrosion preventing substance.

To provide such a device with means to convey corrosion preventing substance to connections and to joints therein.

To provide such a device with means for preventing foreign substance from polluting the corrosion preventing substance and from collecting on elements which contain or convey corrosion preventing substance.

Other objects will be pointed out during the following description of the device shown in the accompanying drawing, or will become obvious and apparent or will suggest themselves upon an inspection of this specification and the accompanying drawing.

Although the present invention is illustrated in the accompanying drawing as being for and applied to the terminal connection of a storage battery, this showing and description, however, is not intended to and is not to be understood as being a limitation of the present invention.

In the accompanying drawing, forming part of this specification:

Fig. 1 is a plan view of a corrosion preventing device embodying the present invention and adapted for a storage battery or equivalent connection.

Fig. 2 is a longitudinal section taken on line 2—2 of Fig. 1 and shows more clearly the relations of the elements between themselves and as related to a terminal post and a lead wire terminal clamped onto the post.

Fig. 3 is a vertical transverse section taken on the line 3—3 of Fig. 1 and shows more clearly the structure of the reservoir and its relation to the base.

Fig. 4 is a horizontal transverse section taken on the line 4—4 of Fig. 1 and shows more clearly the transverse relations of the parts of the reservoir and its relation to the base.

Fig. 5 is a vertical transverse section taken on the line 5—5 of Fig. 1 and shows more clearly the relation of the absorbent member and the receptacle as related to the terminal post.

Similar reference characters refer to similar parts throughout the views.

The present invention is described herein as being a separate, individual device adapted to be attached to the terminal of a storage battery as shown in the accompanying drawing which forms part of this specification. It is thought that this description and showing will enable others to readily understand the present invention to apply the same to storage batteries as well as to various other kinds of connections for the purpose of preventing corrosion therein.

The base A is shown as being made of comparatively thin sheet material and of pan-like formation to form therein the receptacle B defined by the bottom 10 of the base and the flange 11 marginal of the bottom and bent upwardly therefrom. The hole 12 is punched through the bottom 10 to form an aperture for attaching the device as a whole to the terminal post C onto which the lead wire terminal D is clamped. The terminal D is shown in the drawing only so far as it relates to the present invention. The clamping means or any other holding means for holding the terminal D onto the terminal post is not shown in the drawing since it is immaterial as to what kind of holding means is used as far as the present invention is concerned.

The absorbent member, shown as the washer 13 is made of fibrous material and is compressible and absorbent. Wool or felt or a combination thereof has been found quite satisfactory for the washer. The object of the washer is to absorb corrosion preventing substance and to retain it therein and to be compressed by the bottom of the terminal D being pressed thereagainst when necessary or desirable. The hole 14 extends through the member 13 and is originally made a little smaller diametrically so that the same fits closely to the terminal post C when the member 13 is telescoped thereover. The object is to get the member 13 into close contact on the post so that corrosion preventing substance may be conveyed from the member 13 to the terminal post. The cleats 15 are shown integral with the flange 11 and the object thereof is to hold the member 13 in the receptacle during shipment and handling of the device as a whole. The member 13 is shown as being smaller diametrically than the diameter of that part of the receptacle in which it lies so that the channel 16 is formed for corrosion preventing substance to come into contact with the member 13 as much as possible for saturation thereof with the substance. Overflowing of the receptacle B is prevented by the below described restriction of the feeding of corrosion preventing substance to the member 13. The cleats are pressed down into the member 13 as shown so that the member 13 can be compressed as described above.

The part 17 of the base is quite narrow and forms a neck or narrow channel for the below described wick.

The reservoir E is also made of thin sheet material, is shown as being open at the top and having the closed bottom 18 which contacts the bottom 10. The marginal flange 11 contacts the bottom of the circular wall of the reservoir with sufficient friction to retain the reservoir on the device. The circular wall of the reservoir has the depression 19 therein, longitudinally thereof, to form the groove 20 for the below described wick and also has the upper part of the depression cut away to form the aperture 21 so that the mentioned wick can pass through.

The cap 22, also made of thin sheet material, has the circular wall thereof made for frictional contact with the outside of the upper end of the circular wall of the reservoir so that the same may be removed when necessary or desirable but is normally held onto the reservoir by the friction between the cap and the reservoir. The top wall 23 of the cap has the aperture 24 therethrough to form a vent means for the device and to permit of filling of the reservoir with corrosion preventing substance. The apron 25 extends from the circular wall of the cap and reaches down to contact the upper edge of the flange 11 to cover the neck part 17 and the therein deposited wick and the end thereof extends substantially to the edge of the washer 13.

The wick 26, shown by a heavy dotted line, is made of wool or felt or such material as will convey corrosion preventing substance by capillary attraction and has one end thereof disposed in the reservoir and is coiled about therein by a number of convolutions 27 and fills the lower part of the reservoir. The other end of the wick is coiled about in the bottom of the receptacle and under the member 13 by one or more convolutions 28; one convolution being shown for clearaness. The middle part of the wick extends through the channel in the neck 17 and also through the channel or groove 20 and through the aperture 21.

The absorbent element 29 may be made of the same material as the absorbent member or washer 13 and is disposed in the upper part of the reservoir above the convolutions of the wick therein. The screen 30 abuts the upper edge of the reservoir and is held thereagainst by the cap 22 being pressed down over the reservoir.

The washer 13 may be saturated independently with corrosion preventing material if desired although this is not necessary since corrosion preventing substance can reach the same from the reservoir. Corrosion preventing substance is poured into the reservoir to fill all space therein not occupied by elements therein. This corrosion preventing substance may be common oil or an oil or other substance which can convey itself through the wick and through the absorbent members and has the property of preventing corrosion of the material of the members or parts comprising the connection. The well known oils, lubrication oils for instance, do answer very well for connections wherein the parts, or most of them, are made of material which has a ferro base or wherein ferro comprises the main or major part of the parts. Ammonia or equivalent substance may profitably be mixed with the oils for the purpose of giving the corrosion preventing substance better creeping property to better distribute itself over the connection and through the wick.

The disposition of the wick, aided by the outwardly open vent hole or aperture 24 at the top of the reservoir, forms a restrictive means to feed corrosion preventing substance from the reservoir to the washer 13 by capillary attraction and prevents the corrosion preventing substance from syphoning itself out of the reservoir and thereby prevents overflow of the receptacle onto the battery top where damage may be done thereby.

When corrosion preventing substance is in the reservoir, together with the one end of the wick and the absorbent member, the part of the wick in the reservoir first becomes saturated with the substance and then conveys itself to the remainder of the wick by capillary attraction and conveys itself to the absorbent washer around the terminal post and thereby also saturates the washer by capillary attraction. In some instances, some of the substance may deposit itself in the receptacle in further aid to saturating the washer. A special object of the present invention is to prevent overflow of corrosion preventing substance from the reservoir to not only conserve substance and prevent waste thereof but also to prevent damage being done to the battery top by the substance overflowing thereon from the device. The wick is made of such a diameter that diametrical compression thereof may be had either in the channel or groove 20 by the application of the cap over the reservoir for instance or in the channel in the neck 17 and the apron covering the channel.

The reservoir can be filled with corrosion preventing substance either while the cap is removed therefrom or through the vent hole 24. The screen 30 permits the substance to flow therethrough and normally prevents heavier foreign material from getting inside the reservoir. Even if some such material did get through the screen, it would deposit itself on the absorbent element 29 and would not pollute the corrosion preventing substance.

The receptacle may be, and preferably is, filled or packed with loose absorbent material 31; wool being a good material for that purpose. In place of the convolutions shown in Fig. 2, one or two such convolutions may be used in the bottom of the reservoir and the balance thereof filled with packing. Also, the absorbent element 29 may be made much thinner than is shown and the balance of the reservoir filled with packing. Also, the absorbent element 29 may be omitted and the reservoir filled with packing up to the screen.

The device shown and described is made in a unitary structure so that the same can be individually applied to a connection and individually handled and stored and shipped and no alteration is required in any part of a connection to apply the present device.

The device is applied to an existing battery connection by first removing the lead wire terminal from the terminal post; then telescoping the device over the post; then replacing the lead wire terminal and pressing it down against the washer 13 for good contact on the washer by the bottom of the lead wire terminal and compression of the washer when desired; and then clamping the lead wire terminal onto the terminal post. The bottom of the lead wire terminal closes the top of the receptacle when the former is so clamped onto the terminal post.

The device shown and described is economical of manufacture, is efficient in operation, and is easily applied to and removed from a connection.

Having described the present invention in the one form and one application shown, and without limiting myself to the precise form and structure and arrangement of parts as shown and described nor to the application of the present invention as shown and described, except what is covered by the spirit and intent of the present invention and the appended claims.

I claim:

1. A corrosion preventing device, individually attachable to a connection and having a base having an aperture therein for attaching the device to a member of the connection, a marginal flange extending upwardly from the bottom of said base to form a receptacle, an absorbent member in said receptacle and confined by said flange and in contact with said member of the connection and to be contacted by the other member of the connection, the bottom of which also closes a part of said receptacle, an open top reservoir for corrosion preventing substance carried by said base, conveying means to bring corrosion preventing substance from said reservior to said absorbent member and to said receptacle, a cap for the open top of said reservoir and held frictionally thereon and covering the remaining part of said receptacle and said conveying means and having an aperture through the top wall thereof, an absorbent element in the top of said reservoir, and a screen between the top of said absorbent element and the top wall of said cap and over said aperture therein.

2. A corrosion preventing device, individually attachable to a connection and having a sheet metal base with an aperture therethrough for attaching the device to a member of the connection, a marginal flange bent upwardly from the bottom wall of said base to form a receptacle, an absorbent member around said aperture, an open top sheet metal reservoir held onto said base by frictional contact thereof on said flange and having a depression in the circular wall thereof and axially of the reservoir, a conveying means to bring corrosion preventing substance from said reservoir to said absorbent member, a part of said conveying means extending through said depression, and a sheet metal cap over the open end of said reservoir and frictionally held thereon and covering said reservoir and that part of said conveying means which is disposed outside of said reservoir.

3. A corrosion preventing device having a base with a hole therethrough for telescoping the base over a terminal post, the peripheral edge of said base being upturned to form a receptacle, an open top reservoir held to said base by said upturned peripheral edge and being closed at the bottom and having a groove depressed axially in the circular wall thereof, an absorbent washer in said receptacle to be telescoped over said post, a terminal to be clamped onto said post and the bottom thereof in contact with said washer and substantially closing said receptacle when clamped to said post, a wick leading from the interior of said reservoir and through said groove to said washer, a cap over the open end of said reservoir and covering said groove and said wick therein and having a hole through the top thereof, corrosion preventing substance in said reservoir, an absorbent member in said reservoir above the substance therein, and a screen between the top of said absorbent member and the inside of the top of said cap and covering said hole therein.

4. A device for preventing corrosion between joined parts of a structure including a base and two sidewise spaced connected receptacles formed thereon, absorbent means in one of said receptacles to be contacted by both of the joined parts when the device is attached to the structure, means for storing fluidic corrosion preventing substance in the other one of said receptacles, and means for conveying said substance from and out of the top of the other receptacle to said absorbent means by capillary attraction.

5. A device for preventing corrosion between joined parts of a structure including a base having the marginal edge thereof upturned and an aperture therethrough to telescope the base over one of the joined parts of the structure, a reservoir on said base and frictionally held thereon by said upturned edge, fluidic corrosion preventing substance in said reservoir, and means for leading said substance from said reservoir to the joined parts of the structure.

6. A device for preventing corrosion between joined parts of a structure including a base having two receptacles thereon and an aperture therethrough to telescope the same sealingly over one of the parts of the structure, a reservoir in one of said receptacles and frictionally held to said base, fluidic corrosion preventing substance in said reservoir, an absorbent washer in the other one of said receptacles and in contact with both of the joined parts when the device is attached to the structure, and a wick having one end thereof coiled about in said reservoir and in contact with the one of the joined parts and the other end thereof in contact with said washer.

7. A device for preventing corrosion between joined parts of a structure including a base attachable to one of the joined parts of the structure, an absorbent washer on said base and in contact with both of the joined parts of the structure when the device is attached thereto, an open top reservoir frictionally held to said base, fluidic corrosion preventing substance in said reservoir, conveying means for bringing corrosion preventing substance from said reservoir to said washer, and a cover easily removable on the upper end of said receptacle and having a filling hole therethrough and a screen over the hole and a part thereof covering the exposed part of said conveying means.

8. A device for preventing corrosion between joined parts of a structure including a base having the marginal edge thereof upturned to form two connected receptacles thereon, an absorbent washer in one of said receptacles and in contact with both of the joined parts of the structure when the device is attached thereto, a reservoir in the other one of said receptacles, fluidic corrosion preventing substance in said reservoir, absorbent material in said reservoir, and a wick having one end thereof coiled about in said reservoir among said material therein and the middle part thereof leading out of the top of said reservoir and the other end thereof coiled about in said one receptacle and in contact with said washer therein.

WARREN C. BERRYMAN.